March 7, 1961 H. KELCH 2,973,652
ARRANGEMENT FOR TRANSFORMING ROTARY MOVEMENT
INTO RECIPROCATING MOVEMENT
Filed Dec. 8, 1958

INVENTOR
HEINZ KELCH
BY
MICHAEL S. STRIKER
ATTORNEY

United States Patent Office 2,973,652
Patented Mar. 7, 1961

2,973,652

ARRANGEMENT FOR TRANSFORMING ROTARY MOVEMENT INTO RECIPROCATING MOVEMENT

Heinz Kelch, Villingen, Black Forest, Germany, assignor to Firma Kienzle Apparate G.m.b.H., Villingen, Black Forest, Germany Filed Dec. 8, 1958, Ser. No. 778,765

Claims priority, application Germany Dec. 23, 1957

2 Claims. (Cl. 74—54)

The preesnt invention relates to an arrangement for transforming rotary movement of one direction of rotation into reciprocating movement.

Instrument drives and the like frequently require rotary movement of a driving member to be transformed into synchronized reciprocating movement of a driven member when the driving member is moving in one direction.

A specific example of an instrument in which such a requirement exists is a taximeter, the device which computes the fare to be paid by the passenger of a taxicab. Such a fare is commonly computed on the basis of the rate of travel or of the passage of time, whichever is greater at any given moment. A taximeter is therefore alternately driven by a drive arrangement connected with the wheels of the cab and by a second drive arrangement driven by a clockwork. The drive shaft of the taximeter which actuates the indicating counter is driven by the drive arrangement which moves faster. Each drive arrangement includes an overrunning clutch means connected to the drive shaft of the taximeter.

The continuous rotary motion of the drive shaft must be transformed into a reciprocating movement of the member by which the counter is actuated. The actuating member is provided with a cam follower riding along a spiral cam track on a cam which is secured to the drive shaft of the taximeter for rotation therewith. The arc of the spiral cam track is slightly longer than 360°, and the inner and outer ends of the spiral cam track are joined by an undercut shoulder. When the cam follower rides along the spiral cam track through about 360°, the actuating member moves outward with respect to the axis of rotation, and when the cam follower reaches the outer end of the spiral cam track, it moves inwardly until it rests again on the inner end of the cam track and performs the actuating stroke whereupon the cam follower rides again along the spiral cam track to perform the return stroke.

The outer end of the cam track will be unavoidably worn off so that the joining point between the shoulder and the outer end of the cam track will be slightly rounded off. As the cam follower passes over the rearwardly facing rounded off point between the shoulder and the outer end of the cam track, it will urge the cam to rotate slightly faster. Consequently, a relative movement between the driving and driven portions of the overrunning clutch results. Consequently, the drive shaft of the taximeter would finish one revolution in a shorter time as would correspond to the rotary speed of the drive arrangement by which the overrunning clutch is driven.

Since extreme accuracy is required for taximeter drives, it is the object of the present invention to eliminate the effect of the slight acceleration of the cam which is caused by the pressure of the cam follower on the slightly rounded outer end of the spiral cam track.

It is also an object of the present invention to transform a rotary movement into an exactly synchronized reciprocating movement.

With these and other objects in view, the invention contemplates providing cam means mounted on a shaft connected to the driving portion of a free wheeling clutch, the cam means being freely turnable on the shaft through a predetermined arc. This arc is selected so as to be greater than the arc through which the cam means may be rotated by the actuating forward stroke of the reciprocating member.

Lost-motion means are provided between the cam and the taximeter shaft, so that the error introduced by this slight acceleration of the cam by the pressure of the cam follower, is compensated during each revolution of the taximeter drive shaft.

In the preferred embodiment of the present invention, the cam is provided with a part-circular slot into which a coupling pin projects, such coupling pin being secured to the drive shaft of the taximeter on which the overrunning clutches are mounted.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
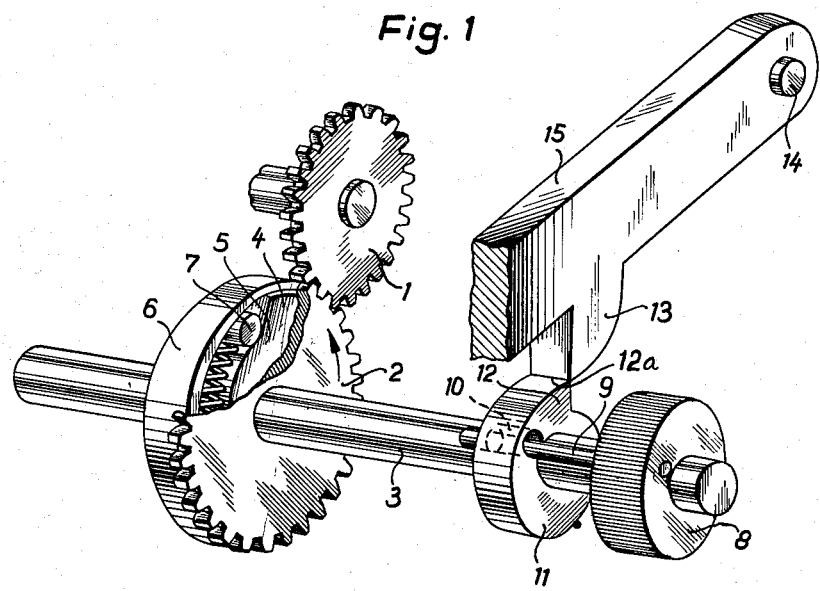
Fig. 1 is a perspective view of a preferred embodiment of the invention, partly in section.

Referring now to the drawings and more particularly to Fig. 1, there is shown a driving gear 1 which may for example be the output gear of the clockwork of a taximeter. Gear 1 engages a gear 2 of the driving portion of a unidirectional overrunning roller clutch of substantially conventional design. The clutch has a driving portion freely turnable on a shaft 3, the driving portion consisting essentially of the gear 2, and a cam member 4 fixedly connected to gear 2 and provided with a plurality of cam surfaces 5 extending obliquely to the radial and circumferential directions.

As explained above, in a conventional taximeter arrangement shaft 3 is also driven from the wheels of a car, for example, through an unidirectional overrunning clutch (not shown).

Rollers 7 are mounted on the driving member of the clutch and are spring biased in a substantially circumferential and outward direction. The driven portion of the free wheeling roller clutch is fixedly mounted on shaft 3 and includes a shell member 6 having a cylindrical inner surface adapted to engage rollers 7 and to wedge them into the angular space formed between the cam surface 5 and the inner surface of shell 6 when the driving portion 2, 4 of the clutch rotates in the direction of the arrow.

Figure 2:
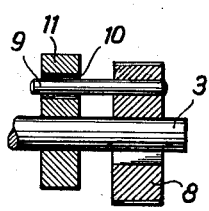
Fig. 2 is a fragmentary axially sectional view of the device of Fig. 1.

An adjusting disc 8 is fixedly fastened to shaft 3 and is equipped with an eccentric entraining coupling pin 9, as shown in additional detail in Fig. 2. Pin 9 axially extends from disc 8 and engages part-circular slot 10 of a lifting cam 11 which is freely turnable on shaft 3 and has a peripheral cam track spiraling outward from shaft 3, the innermost and outermost ends of the spiral cam track being joined by a steep radial shoulder 12.

A cam follower dog 13 of the lever 15 pivotally supported on a shaft 14 is held in engagement with the cam track of lifting cam 11 by the weight of lever 15 which thus reciprocally oscillates in an up and down movement during rotation of cam 11 and transmits such reciprocating oscillations to a counter mechanism for stepwise advance of the counter.

Figure 3:
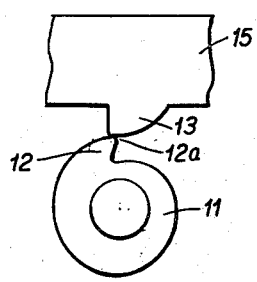
Fig. 3 is an elevation of a detail.

Slot 10 in lifting cam 11 extends through a longer arc than pin 9 so that the pin is free to travel in a limited arcuate path within the recess 10 without inducing movement of cam 11. During rotation of disc 8 in the direction of the arrow, the pin 9 tends to be in counterclockwise engagement with the end of slot 10 as indicated in Fig. 1 as long as cam follower dog 13 travels over the spiraling portion of the cam track of cam 11 as shown in Fig. 3. When dog 13 drops along the unavoidably slightly rounded tip 12a of the radial step or shoulder 12 of cam 11, it urges the cam forward to move faster in the direction of the arrow than disc 8 even if the radial step 12 is undercut. Cam 11 thus tends to overtravel pin 9 while dog 13 exerts forward pressure on the portion of the tip 12a which faces rearwardly in direction of rotation. If it were not for the lost-motion of pin 9 in slot 11, such movement of cam 11 induced by the downward forward stroke of lever 15 would tend to make the driven portion 6 of the free-wheeling clutch move faster than the driving portion so as to release the tension on rollers 7 and thereby allow a small relative movement between the driving and driven portions of the clutch.

As the clutch is permanently engaged, and a small relative movement between driving and driven parts may be restored during continued movement of gear 2, but it may also be not restored, particularly if the output gear, which is connected to the wheels, and the respective clutch, not shown, take over the drive of shaft 3, so that synchronization of the movement of gear 1 and lever 15 would be impaired.

Such inaccuracy is avoided by the lost-motion coupling means including pin 9 and slot 10 in cam 11. The arcuate path of pin 9 in slot 10 is selected to be of greater length than the arc of the movement of cam 11 induced by downward travel of dog 13 over the slightly rounded tip 12a of shoulder 12 of cam 11. During such downward travel, the pin 9 moves counterclockwise relative to slot 10, but this counterclockwise movement ends before the pin abuts against the end wall of slot 11, and such movement therefore is not transmitted to shaft 3 or shell 6 of the clutch, and engagement of the clutch is not broken during the forward and downward stroke of the lever 15.

As the clutch continually rotates disc 8 the pin is moved back counterclockwise into the position illustrated in Fig. 1 and lifting movement of cam 11 is actuated.

It will be understood that each of the elements described above, or two or more together, may also find a useful application in other types of movement transforming arrangements differing from the types described above.

While the invention has been illustrated and described as embodied in a taximeter drive, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An arrangement for transforming a rotary movement into a reciprocating movement, comprising, in combination, a rotary driving member rotating in one direction; a shaft means; unidirectional overrunning clutch means connecting said driving member to said shaft means for driving said shaft means; a cam means mounted on said shaft means freely turnable thereon, said cam means having a spiral cam track the inner end and outer end of which are joined by a shoulder, said outer end and said shoulder forming a slightly rounded portion rearwardly facing with respect to said direction of rotation; lost-motion coupling means operatively connecting said shaft means with said cam means and limiting relative angular displacement between said shaft means and said cam means so that said cam means normally rotates with said shaft means; and a reciprocable member having a cam follower urged against said cam track and causing said reciprocable member to perform a return stroke while said cam follower engages said cam track and a forward stroke when said cam follower moves from said outer end to said inner end of said cam track so that when said cam follower passes over said slightly rounded rearwardly facing portion and urges said cam means to turn through a small arc in the direction of rotation, said lost-motion coupling means prevents corresponding angular displacement of said shaft means relative to said driving member.

2. An arrangement for transforming a rotary movement into a reciprocating movement, comprising, in combination, a rotary driving member rotating in one direction; a shaft means; unidirectional overrunning clutch means including a first clutch part connected to said driving member for rotation and a second clutch part connected to said shaft means for driving said shaft means when said first clutch part tends to rotate faster than said second clutch part; a cam means mounted on said shaft means freely turnable thereon, said cam means having a spiral cam track the inner end and the outer end of which are joined by a shoulder, said outer end and said shoulder forming a slightly rounded portion rearwardly facing with respect to said direction of rotation and extending through a small arc, said cam means having a part-circular slot concentric with said shaft means; lost-motion coupling means including a disc adjustably mounted on said shaft means, and an axially extending coupling pin fixed on said disc and projecting into said slot for operatively connecting said shaft means with said cam means and limiting relative angular displacement between said shaft means and said cam means to a predetermined arc greater than said small arc so that said cam means normally rotates with said shaft means; and a reciprocable member having a cam follower urged against said cam track and causing said reciprocable member to perform a return stroke while said cam follower engages said cam track and a forward stroke when said cam follower moves from said outer end to said inner end of said cam track so that said cam follower passes over said slightly rounded rearwardly facing portion and urges said cam means to turn through said small arc in the direction of rotation while said lost-motion coupling means prevents corresponding angular displacement of said shaft means and of said second clutch part relative to said first clutch part and to said driving member.

References Cited in the file of this patent

UNITED STATES PATENTS

| | | |
|---|---|---|
| 740,816 | Daily | Oct. 6, 1903 |
| 1,116,780 | Allison | Nov. 10, 1914 |
| 2,869,375 | Lewis | Jan. 20, 1959 |